United States Patent [19]
Fay

[11] Patent Number: 5,315,742
[45] Date of Patent: May 31, 1994

[54] HOSE CLAMP WITH OPEN DIAMETER LOCK

[75] Inventor: Robert F. Fay, York, Pa.

[73] Assignee: Murray Corporation, Cockeysville, Md.

[21] Appl. No.: 3,639

[22] Filed: Jan. 13, 1993

[51] Int. Cl.⁵ .............................................. F16L 33/08
[52] U.S. Cl. .................................. 24/274 R; 285/367; 285/410; 285/253
[58] Field of Search ........................ 285/367, 410, 253; 24/274 R, 279

[56] References Cited

U.S. PATENT DOCUMENTS

| | | | |
|---|---|---|---|
| 2,910,758 | 11/1959 | Arthur | 24/274 R |
| 4,637,100 | 1/1987 | Ishihata | 24/274 R |
| 4,956,898 | 9/1990 | Miyamura et al. | 24/274 R |

FOREIGN PATENT DOCUMENTS

| | | | |
|---|---|---|---|
| 225485 | 1/1963 | Austria | 24/274 R |
| 589431 | 6/1947 | United Kingdom | 24/274 R |
| 660981 | 11/1951 | United Kingdom | 24/274 R |

*Primary Examiner*—Randolph A. Reese
*Assistant Examiner*—Heather Chun
*Attorney, Agent, or Firm*—Leonard Bloom

[57]  ABSTRACT

A clamp for hoses, pipes and the like which incorporates an open diameter lock for maintaining the clamp at a selected diameter despite shipping and other stresses, and for preventing the clamp from opening-up beyond the "full-open" diameter. The open diameter lock of the present invention will not interfere with further tightening of the clamp, and it serves to give a visual gauge of the nominal open diameter of the clamp.

10 Claims, 2 Drawing Sheets

HOSE CLAMP WITH OPEN DIAMETER LOCK

FIELD OF THE INVENTION

The present invention relates to clamps for holding hoses, pipes and the like and, in particular, to an open diameter lock for such clamps which provides a positive resistance for preventing undesired opening-up of the clamp, and which allows one to visibly gage the nominal open diameter of the clamp.

BACKGROUND OF THE INVENTION

Numerous clamps are commercially available for clamping the outer diameter of hoses, pipes and the like. Such clamps typically include a clamp band that is maintained in a circular arrangement with its opposite ends overlapping each other in order to encircle the outer diameter of the hose. Such clamps further include a tightening device (usually a worm gear having a threaded screw that mates with slots formed in the clamping band) for reducing or expanding the outer diameter of the band, thereby respectively tightening or loosening the band around the hose.

A particular problem encountered with such clamps is spontaneous loosening. For instance, many of these clamps receive post assembly washing and/or plating operations which agitate the clamps and induce the clamping bands and worm gear to loosen. Moreover, such clamps are often shipped as part of a preliminary assembly and are loosely fit over the ends of hoses, air ducts and the like prior to shipment. These clamps are subjected to shaking and rattling during shipment, and this can result in undesirable loosening of the worm gear. The loosened clamps often run afoul of the strict open-diameter shipping tolerances which are imposed by customers and industry standards. Moreover, the clamps may loosen beyond a "full-open" (or maximum diameter) position. Should the clamp be inadvertently opened beyond the "full-open" diameter, the worm gear will disengage and the clamping band will lose its circular arrangement. An inordinate amount of time must be spent threading the band back through the worm gear to regain the circular form and intended diameter.

The quality requirements at the OEM level have become so stringent that assembly plants will now often reject entire shipments for a couple of disengaged clamps. Of those clamps which do reach the consumer intact, many are returned for OEM repair or replacement after having been disengaged by the consumers.

As a result, certain safeguards have been proposed to avoid spontaneous loosening and disengagement. Such safeguards generally involve increasing the resistance of the worm gear. Unfortunately, this also renders the worm gear more difficult to tighten, and this can run afoul of the low free running torque specifications which are likewise imposed by consumers and industry standard. These specifications essentially dictate that the worm gears have nearly zero turning resistance.

Another common solution comes in the form of tabs formed in one of the clamping bands which engage the worm gear housing to form a structural assembly. Such arrangements can be found by reference to U.S. Pat. Nos.: 2,910,758 issued to Arthur; 2,571,659 issued to Bergstrom; 3,303,544 issued to Nigon; 3,521,334 issued to Bergstrom; 4,237,588 issued to Rasmussen et al.; 3,950,830 issued to Duprez; and 4,286,361 issued to Mackenzie.

The above-referenced patents provide a solution to ultimate disengagement of the worm gear. Conversely, U.S. Pat. No. 4,637,100 issued to Ishihata shows clamping bands with a mating tab and slot arrangement to prevent over-tightening of the band. Regardless, these and other known locking tabs or detent arrangements provide an immutable engagement. The particular diameter at which the lock engages cannot be adjusted or easily changed. None of the prior art locking arrangements is capable of maintaining a selectable fixed open-diameter for shipping purposes or otherwise without creating excessive resistance to turning of the worm gear.

SUMMARY OF THE INVENTION

It is, therefore, an object of the present invention to provide a clamp for clamping hoses, pipes and the like that incorporates an open diameter lock for resisting the opening of the clamp beyond a full open-diameter position.

It is another object of the present invention to provide an open diameter lock as described above which does not create excessive interference during tightening of the clamp.

It is another object of the present invention to provide an open diameter lock which does not bear upon or reduce the pitch of the screw threads of the driving worm gear.

It is a further object of the invention to provide an open diameter lock as described above which gives a visual indication that the clamp is set at its nominal open diameter.

In accordance with the above-described objects, the present invention provides an open diameter lock for a clamp of the type having a band with opposite ends drawn upon themselves to form a circle, and a gear mechanism for selectively constricting and expanding the circular band for clamping hoses, pipes and the like. The open diameter lock further comprises a lanced tab near one end of the band and a notch formed near the other end of the band. The lanced tab may be formed as a resilient finger angled away from the one end of the band to form a ramped surface. The lanced tab thereby catches the notch during expansion of the band before the clamp opens beyond a "full-open" diameter. Further opening and possible disengagement from the worm gear are prevented. However, when the worm gear mechanism is operated to constrict the band, the lanced tab disengages from the notch to allow further tightening of the clamp. Alternatively, the lanced tab may be formed by two incisions in the band and an outwardly bowing of the section of the clamping band between the two incisions. The lanced and bowed tab likewise engages the notch to provide a positive resistance to any further expansion of the clamping band. However, the engagement may be broken by a threshold level of driving force. Hence, further intentional expansion of the clamp past the full open diameter position is possible.

Other advantages and results of the invention are apparent from a following detailed description by way of example of the invention and from the accompanying drawings.

DETAILED DESCRIPTION OF THE PREFERRED EMBODIMENT

Figure 1:
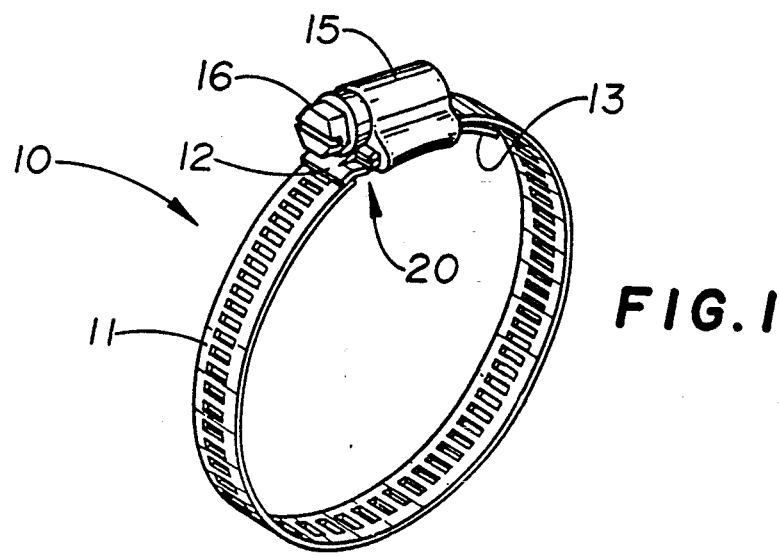
FIG. 1 is a perspective view of an open diameter lock according to one embodiment of the present invention incorporated in a hose clamp.

Referring now to FIG. 1, the open diameter lock of the present invention is shown in the context of a hose clamp 10. Hose clamp 10 includes a clamping band 11 having a first end 12 and a second end 13 which are drawn upon themselves to form a circular ring. A plurality of slots 14 is formed along the length of the clamping band 11.

The second end 13 is secured to a housing 15 by welding or other suitable means. Housing 15 serves as a guide for receiving and guiding the first end 12 of the clamping band 11 over the second end 13 during movement relative thereto.

Housing 15 also carries a worm gear or other suitable drive assembly in operative engagement with the clamping band ii. The illustrated worm gear comprises a screw 16 having drive threads 17. Screw 16 is rotatably mounted within housing 15 and may be rotated in a first direction to constrict the clamping band 11 or in a second direction to expand the clamping band 11. More specifically, rotation of the worm gear screw 16 in the first direction causes the screw threads 17 to mesh with the slots 14 in the clamping band 11, thereby driving the first end 12 away from the underlying second end 13 in order to constrict the clamping band 11. Conversely, rotation of the worm gear screw 16 in the second direction causes the screw threads to mesh with the slots 14 in the clamping band 11, thereby retracting the first end 12 back to the second end 13 in order to expand the clamping band.

The open diameter lock 20 according to the present invention is provided to lock the clamp in a "full-open" diameter to prevent further loosening and possible disengagement. However, the open diameter lock does not interfere with further tightening of the hose clamp.

Figure 2:
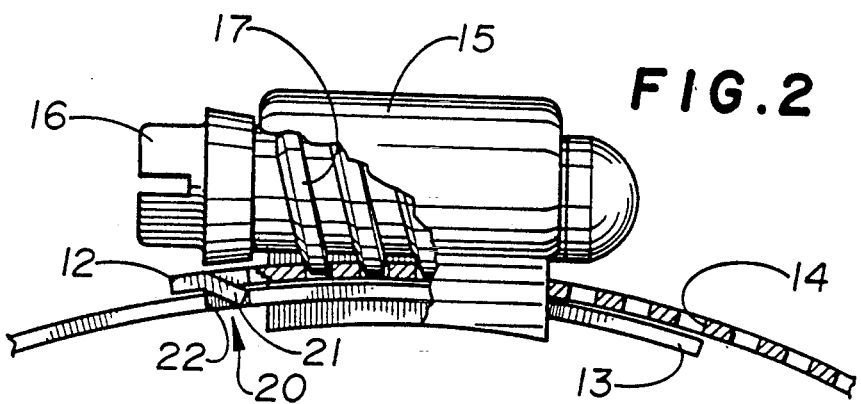
FIG. 2 is an enlarged cut-away view of the open diameter lock of FIG. 1.
Figure 3:
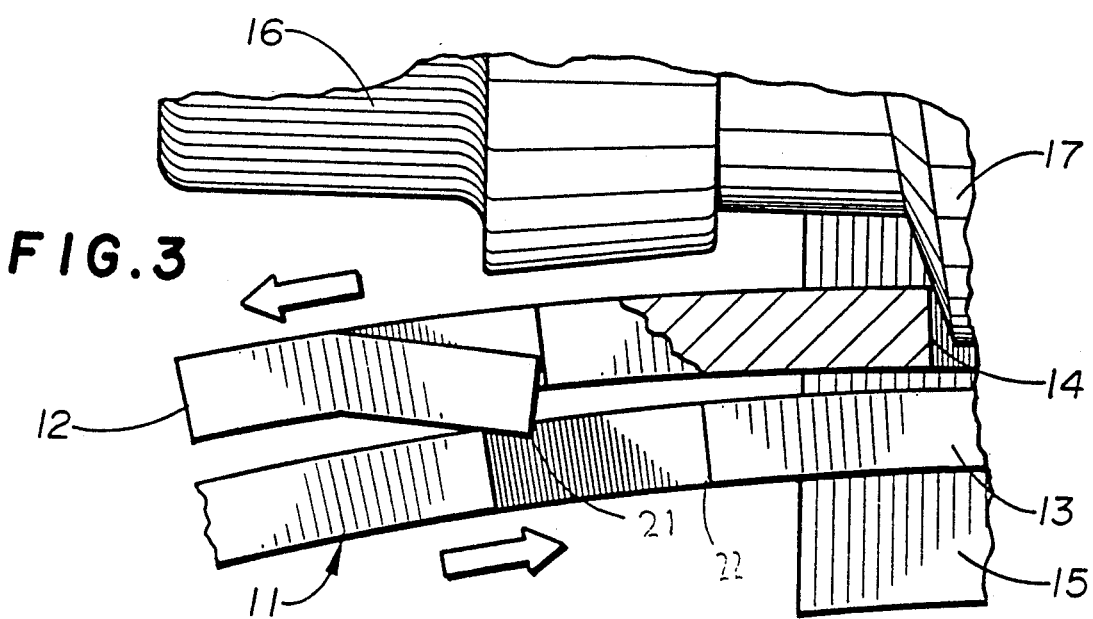
FIG. 3 illustrates the operation of the open diameter lock of FIGS. 1 and 2 as the hose clamp is being tightened.

As shown more clearly in FIGS. 2 and 3, lock 20 includes a lanced tab 21 formed in clamping band 11 near the first end 12. Lock 20 further comprises a notch 22 formed in clamping band 11 near the second end 13 and opposite lanced tab 21. Lanced tab 21 and notch 22 are relatively positioned along clamping band 11 and establish a "full-open" diameter when super-positioned.

In operation, rotation of the worm gear screw 16 in the second direction draws the overlying ends 12 and 13 of the clamping band 11 toward each in order to expand the clamping band 11, and this continues until the clamping band 11 nears the full open diameter. At this point, the lanced tab 21 becomes engaged in the notch 22 before the first end 12 of the band 11 passes through the housing 15. It should be clear that a substantial and positive resistance to the clamp 10 opening-up beyond the "full-open" diameter is therein provided. In addition, the lanced tab 21 provides a simple visual indication that the clamp is set at its nominal open diameter.

Insofar as the embodiment of the open diameter lock 20 illustrated in FIGS. 1-3, the lanced tab 21 is formed near the first end 12 of clamping band 11 and the notch 22 is formed near second end 13 which is fixed to housing 15. In this particular embodiment, the lanced tab 21 is formed as a resilient finger which extends angularly from the first end 12 of the band 11 in the direction of the second overlying end 13. This way, as the first end 12 of the band 11 is driven by the worm gear toward the second overlying end 13 of band 11 in order to expand the clamp, the lanced tab 21 becomes engaged in the notch 22. The tab 21 thereby provides a positive resistance to any further retraction of the first end 12 of the band 11, and clamping band 11 is enjoined from further loosening beyond the "full-open" diameter.

The lanced tab 21 ramps away from the first end 12. In addition, the lanced tab 21 is resilient and is free to flex inwardly against the band 11. Consequently, as the first end 12 of the band 11 is driven by the worm gear away from the second overlying end 13 of band 11 in order to constrict the clamp, tab 21 disengages from the notch 22 (as shown in FIG. 3). Thus, the open diameter lock poses no obstruction to further tightening of the hose clamp.

It will be appreciated by those skilled in the art that lanced tab 21 may alternatively be formed near the second fixed end 13 of clamping band 11 (rather than the first end 12), and notch 22 may be formed near first end 12 (rather than the second end 13). In this case, the lanced tab 21 should extend upwardly from the second end 13 of the band 11 at approximately the same angle as in the above-described embodiment toward the first overlying end 12. This way, as the first end 12 of the band 11 is driven by the worm gear toward the second overlying end 13 of band 11 in order to expand the clamp, the notch 22 catches the lanced tab 21 as the "full-open" diameter is attained. As before, the tab 21 provides a positive resistance to the further movement of the first end 12 of the band 11. Once again, an identical lanced and notch configuration may be included on the opposite side of the clamping band 11 to increase the strength and stability of the locking feature.

In addition, an identical lanced tab 21 and notch configuration may be included on the opposite side of the clamping band 11 to increase the strength and stability of the locking feature.

Still other variations are possible and are considered to be within the scope of the invention. For instance, the first end 12 of the clamping band 11 may be fixed to the housing 15 (rather than the second end 13), and the second end 13 may be slidably carried in housing 15.

Figure 4:
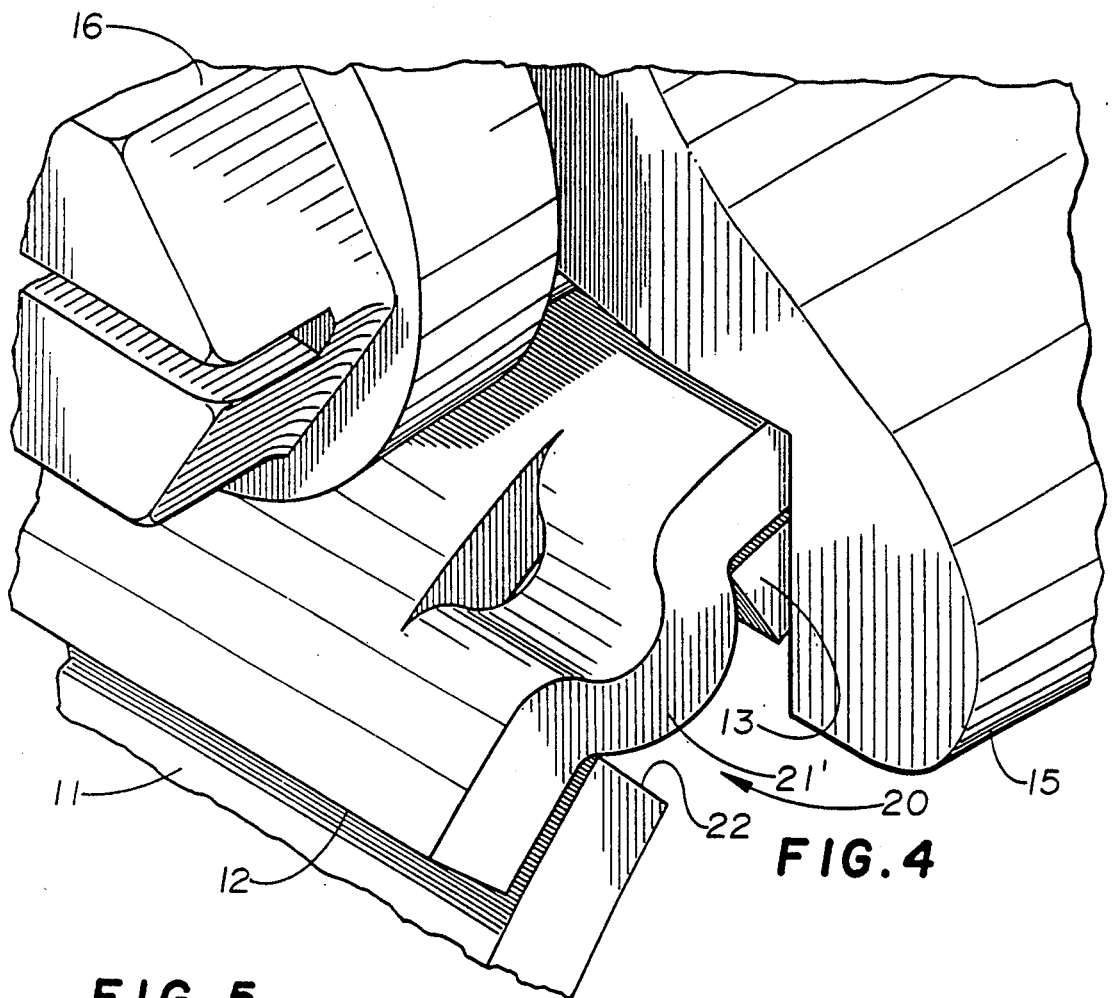
FIG. 4 is an enlarged view of an alternative embodiment of the open diameter lock according to the present invention.
Figure 5:
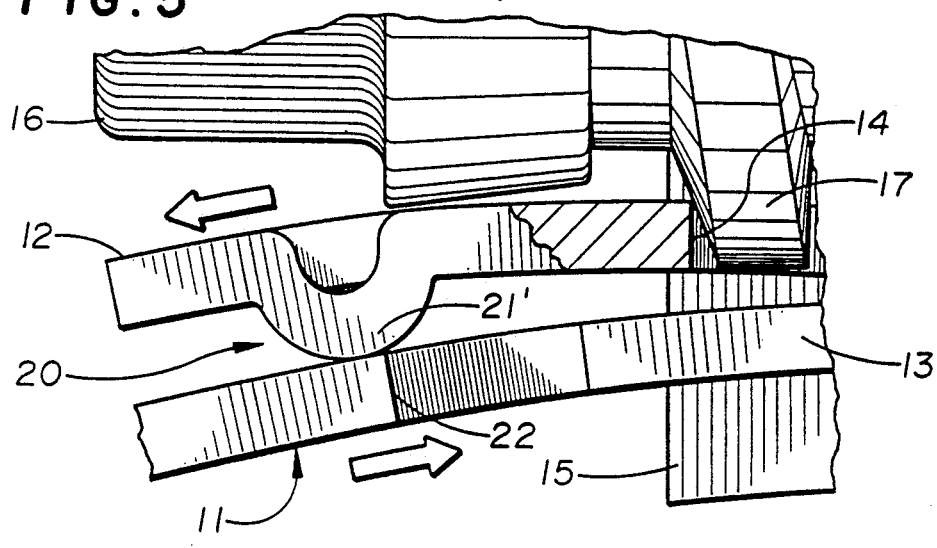
FIG. 5 illustrates the operation of the open diameter lock of FIG. 4 as the hose clamp is being tightened.

FIG. 4 illustrates an alternative configuration of lanced tab 21'. Here, lanced tab 211 is formed by a short incision spaced near one side of end 12 of the clamping band 11. The area of the clamping band 11 lying outside the incision is bowed outwardly such that it protrudes toward the other overlying end of the clamping band ii. As before, this lanced and bowed tab 21' provides a ramped surface which is angled rearwardly of the first end 12 so that as the first end 12 of the band 11 is driven by the worm gear toward the second overlying end 13 of band 11 in order to expand the clamp, the lanced tab 21 becomes engaged in the notch 22. The lanced and bowed tab 211 provides a positive resistance to any further retraction of the first end 12 of the band 11, and clamping band 11 resists further loosening beyond the "full-open" diameter. However, the lanced and bowed tab 21' of the present configuration differs because the engagement may be broken by further intentional operation of the worm gear. As shown in FIG. 5, persistent driving of the first end 12 of the band 11 toward the second overlying end 13 of band 11 results in a threshold level of driving force, and this eventually breaks the engagement of tab 21' in notch 22 to allow further expansion of the clamp past the full open diameter position.

As in the previous embodiment, an identical lanced tab 21' and notch configuration may be included on the opposite side of the clamping band 11 to increase the strength and stability of the locking feature.

Having now fully set forth a detailed example and certain modifications incorporating the concept underlying the present invention, various other modifications will obviously occur to those skilled in the art upon becoming familiar with said underlying concept. It is to be understood, therefore, that within the scope of the appended claims, the invention may be practiced otherwise than as specifically set forth herein.

We claim:

1. In a clamp of the type having a band with opposite ends drawn upon themselves to form a circle, and a gear mechanism for selectively constricting and expanding the circular band for clamping hoses and pipes, an open diameter lock comprising:
   a lanced tab means near one end of said band; and
   a notch formed in the band near the other end of said band;
   wherein operation of the gear mechanism in one direction expands said band such that said tab means engages said notch to impose a positive resistance before said clamp opens beyond a "full-open" diameter, and operation of the gear mechanism in the other direction constricts said band such that said tab means disengages said notch during further tightening of said clamp.

2. The open diameter lock of claim 1 wherein said lanced tab means resilient, such that during constriction of the band the lanced tab means is deflected out of said notch.

3. The open diameter lock of claim 2 wherein said lanced tab means is formed as a resilient finger angled divergently away from said one end of said band, said tab means forming a ramped surface to facilitate disengagement from the notch in the other end of said band when said gear mechanism is operated to constrict said band.

4. The open diameter lock of claim 2 wherein said lanced tab means including an incision along one side of said band and an outwardly bowed section between said incision and the side of said band.

5. The open diameter lock of claim 2 wherein said lanced tab means and notch are relatively positioned along said clamp band to mark a nominal full-open position when engaged, and the proximity of said lanced tab means to said notch serves as a visual gauge of the open diameter of said clamp.

6. A clamp for clamping hoses and pipes comprising:
   a clamp band having a first end and a second end drawn upon themselves to form a ring;
   a gear housing secured to the first end of said clamp band for receiving and guiding the second end of the clamp band therethrough;
   a worm gear carried in said housing and operative on said second end of the clamp band for selectively driving said second end relative to said first end to thereby constrict and expand the circular band; and
   an open diameter lock including a lanced tab means formed in the second end of the clamp band, and a notch formed in the first end of the clamp band;
   wherein expanding said clamp band moves said second end toward said first end such that said tab means engages said notch thereby imposing a positive resistance before said clamp band exceeds a "full-open" diameter and operation of the worm gear moves the second end away from the first end and constricts said clamp band such that said tab means disengages said notch thereby allowing further tightening.

7. The open diameter lock of claim 6 wherein said lanced tab means is resilient, such that during constriction of the band the lanced tab means is deflected out of said notch.

8. The open diameter lock of claim 6 wherein said lanced tab means is formed as a resilient finger angled divergently away from said second end of said band, said tab means forming a graduated ramped surface to facilitate disengagement from the notch in the first end of said band when the worm gear is operated to constrict said band.

9. The open diameter lock of claim 6 wherein said lanced tab means including an incision along one side-of said clamp band and an outwardly bowed section between said incision and the side of said band.

10. The open diameter lock of claim 7 wherein said lanced tab means and notch are relatively positioned along said clamp band to mark a nominal full-open position when engaged, and the proximity of said lanced tab means to said notch serves as a visual gauge of the open diameter of said clamp.

* * * * *